United States Patent [19]
Mohaupt et al.

[11] Patent Number: 6,122,964
[45] Date of Patent: Sep. 26, 2000

[54] MICROMECHANICAL COMB STRUCTURE

[75] Inventors: Jens Mohaupt, Pliezhausen; Markus Lutz, Reutlingen, both of Germany

[73] Assignee: Robert Bosch GmbH, Stuttgart, Germany

[21] Appl. No.: 09/257,618

[22] Filed: Feb. 25, 1999

[30] Foreign Application Priority Data

Feb. 28, 1998 [DE] Germany .......................... 198 08 549

[51] Int. Cl.[7] ............................................... G01P 15/125
[52] U.S. Cl. ................................ 73/514.32; 73/862.626
[58] Field of Search ........................ 73/514.32, 862.337, 73/862.626; 310/311, 321, 370, 334, 313 B

[56] References Cited

U.S. PATENT DOCUMENTS

| | | | |
|---|---|---|---|
| 3,984,791 | 10/1976 | Deacon | 310/313 B |
| 4,162,465 | 7/1979 | Hunsinger et al. | 310/313 B |
| 4,206,380 | 6/1980 | Hazama et al. | 310/313 B |
| 4,866,325 | 9/1989 | Kodama et al. | 310/313 B |
| 4,918,349 | 4/1990 | Shiba et al. | 310/313 B |
| 4,954,795 | 9/1990 | Choi | 310/313 B |
| 5,142,185 | 8/1992 | Noel et al. | 310/313 B |
| 5,481,102 | 1/1996 | Hazelrigg, jr. | 235/487 |

*Primary Examiner*—Richard A. Moller
*Attorney, Agent, or Firm*—Kenyon & Kenyon

[57] ABSTRACT

Micromechanical comb structure includes a first comb device having a plurality of prongs and a second comb device having a plurality of prongs. The prongs of the first comb device and the prongs of the second comb device mesh with one another so that they are arranged side-by-side in pairs to form measuring capacitors. The prongs of at least one of the comb devices are designed to produce a variation in the mechanical natural frequencies of the prongs.

10 Claims, 4 Drawing Sheets

MICROMECHANICAL COMB STRUCTURE

FIELD OF THE INVENTION

The present invention relates to a micromechanical comb structure and, in particular, a micromechanical comb structure with a first comb device having a plurality of prongs and a second comb device having a plurality of prongs. The prongs of the first comb device and the prongs of the second comb device mesh with each other so that they are arranged to form sensor and/or actuator capacitors.

BACKGROUND INFORMATION

FIG. 4 shows a conventional micromechanical comb structure as one part of a conventional capacitive, laterally measuring acceleration sensor. This conventional acceleration sensor has a seismic mass 3 which is movably connected to an anchoring arrangement 2 by spiral springs 1.

A first stationary comb structure 11a and a second stationary comb structure 11b are arranged in relation to comb structures 8a and 8b provided on movable seismic mass 3 so that prongs 111 of first stationary comb device 11a and prongs 112 of second stationary comb device 11b are arranged in pairs next to prongs 80 and 81 of comb devices 8a and 8b in order to form measuring capacitors.

Capacitively measuring acceleration sensors of this type are usually made up entirely of identical comb structures 8a, 8b, 11a, 11b with prongs of the same length and the same shape.

In order to evaluate the small changes in useful capacitance of the measuring capacitors, a high frequency electrical signal of 20 kHz to 2 MHZ, for example, is applied to the measuring capacitors. The spectra of rectangular-pulse, triangular-pulse and similar evaluation signals have many even higher frequencies.

The fundamental mode, i.e., the mechanical resonant frequency of the element (intentional excursion for measuring an acceleration) of sensitive direction 6, ranges between a few 100 Hz and a few kHz to around 20 MHZ, depending on the acceleration range.

Because comb structures 8a, 8b, 11a, 11b are free-standing, they can also move independently, thus producing a further, higher-frequency mechanical mode 9, known as the "prong mode". The natural resonance of a prong ranges from 20 kHz to 1 MHZ, depending on the geometric shape, so that it lies precisely within the range of the electrical evaluation frequency.

The electrical excitation voltage is known to produce electrostatic forces between the capacitor plates. When the natural frequencies of the prongs coincide with the electrical evaluation frequency or a spectral component thereof, resonant vibrations are induced in the prongs, which can produce considerable evaluation errors because the electronics cannot distinguish between a natural vibration and a vibration due to the effect of an external acceleration. These types of effects can also greatly influence the temperature responses of the sensors, since the oscillator frequencies are not thermally stable.

FIG. 5 shows a schematic representation of a second design of a conventional micromechanical comb structure of an acceleration sensor.

FIG. 5 shows the reference numbers which designate the same components as shown in FIG. 4. The second conventional design shown in FIG. 5 additionally provides third and fourth stationary comb structures 12a, 12b so that, as in the design shown in FIG. 4, first and second measuring capacitors 4, 5 are provided for differential measurements between movable comb structures 8a, 8b of seismic mass 3 and the stationary comb structures.

FIGS. 3a and 3b show a Bode diagram for the excitation of an acceleration sensor having a conventional comb structure illustrated in FIG. 4 or 5. In particular, FIG. 3a shows the amplitude plotted against the excitation frequency, and FIG. 3b shows the phase plotted against the excitation frequency.

In FIGS. 3a and 3b, numeral 16 represents the resonant frequency of the working mode, numeral 17 represents the resonant frequency of the prongs or fingers, and numeral 18 represents the open-loop gain.

Especially in the case of closed-loop measurement methods, also known as closed-loop position control or force compensation, a closed loop can become unstable in the typical comb structures, as illustrated in FIGS. 3a and 3b. Because the resonance sharpness of the prongs extends above the 0 dB line, the loop exhibits unstable behavior at points 17 and 17' while closing, i.e., it no longer has any amplitude reserves. The loop could be closed with less loop gain, but this would no longer have any advantage over the open-loop measurement method.

An attempt to solve this problem was made with the ADLX50 acceleration sensor developed by Analog Devices, in which a low pass with a cut-off frequency of around 100 Hz was connected on the line side. Although this closes the loop, it does so only at a sufficiently low frequency.

FIG. 6 shows a schematic representation of a conventional micromechanical comb structure of a micromechanical drive. In FIG. 6, the same reference numbers designate the same components, or components with the same functions, as shown in FIGS. 4 and 5. In addition, numeral 13 designates a movable mass, numeral 14 designates a desired direction of movement, and numeral 15 designates a parasitic prong mode. As shown in FIG. 6, prongs 80 are drawn between prongs 111 against the resistance of spiral spring 1 in driving direction 14.

The disadvantages regarding the excitation frequency response described above apply in the same or similar manner to capacitive comb drives of this type, as illustrated in FIG. 6.

SUMMARY OF THE INVENTION

A micromechanical comb structure according to the present invention is advantageous in that the distribution of natural frequencies prevents areas of spectral disturbance from forming.

The micromechanical comb structure of the present invention provides prongs of at least one of the comb devices so that the mechanical natural frequencies of the prongs are varied. The broader distribution of natural frequencies thus prevents an excitation of the mechanical natural frequencies from interfering with the high-frequency excitation of the capacitors in the working mode for measurement or driving purposes.

According to the present invention, the excursion can be reset to zero in the closed-loop method even at higher frequencies, making it possible to achieve better dynamics.

Staggering or distributing the natural frequencies of the prongs or prongs reduces the amplitude of the prong mode (interference mode), due to the variety of the different staggered natural frequencies. In other words, the maximums are spread according to the interference mode shown in FIGS. 3a and 3b so that they no longer have any significance for the evaluation method. This provides more amplitude reserves for a closed-loop evaluation, making it possible to close the loop with the desired higher loop gain.

The same holds true for the above-described evaluation errors that occur with higher-frequency signals. The errors are reduced through the number of staggered arrangements selected.

According to one embodiment of the present invention, the prongs of at least one of the comb devices have a variable geometry, in particular, a variable length and/or width and/or height. This is a suitable method, from a process engineering standpoint, for expanding the mechanical natural frequency spectrum.

According to another embodiment of the present invention, the prongs of at least one of the comb devices have a variable material structure. This can be achieved, for example, by varying the mass through depositing additional material on the prongs.

According to another embodiment of the present invention, pairs of two adjacent prongs, one of which belongs to the first comb device and the other to the second comb device, have the same geometry.

According to another embodiment of the present invention, the length of the prongs increases gradually from a first value at one end of the comb device to a second value in the middle of the comb device and, from here, decreases gradually again to the first value in the direction of the other end.

According to another embodiment of the present invention, at least one portion of the prongs has a double-arm structure with a first prong, a second prong, and at least one connecting web between the two prongs. This is a further suitable method, from a process engineering standpoint, for tuning the mechanical natural frequencies, for example by varying the number and position of the connecting webs.

Although the micromechanical comb structure according to the present invention can be used in any type of micromechanical comb structure, the micromechanical comb and its underlying principle are described below with reference to an exemplary micromechanical acceleration sensor.

DETAILED DESCRIPTION

Figure 1:
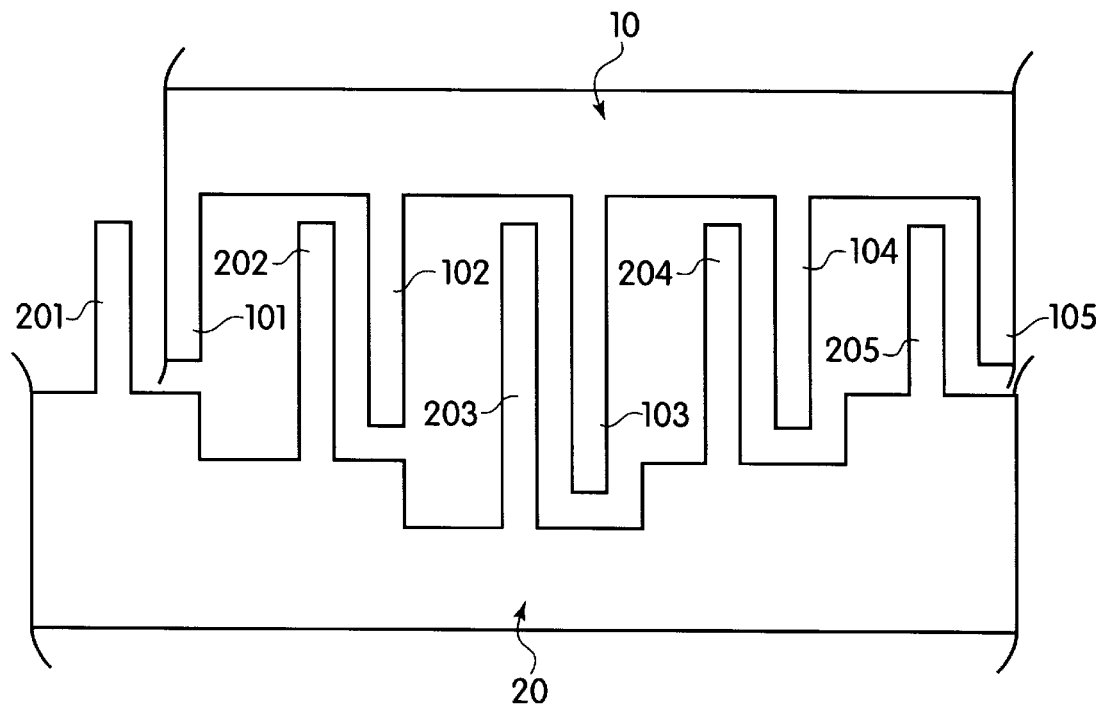
FIG. 1 shows a diagram of an embodiment of a micromechanical comb structure according to the present invention.

FIG. 1 shows a schematic diagram of one embodiment of the micromechanical comb structure according to the present invention.

In FIG. 1, 10 designates a first comb device, 20 a second comb device, 101–105 designate prongs of first comb device 10, and 201–205 prongs of second comb device 20.

Prongs 101–105 of first comb device 10 and prongs 201–205 of second comb device 20 mesh with one another so that they are arranged side-by-side in pairs to form measuring capacitors.

Prongs 101–105 and 201–205 of comb devices 10, 20 are designed so that a pair of two adjacent prongs 101, 201; 102, 202; 103, 203; 104, 204; 105, 205 (one of which belongs to first comb device 10 and the other to second comb device 20) has the same geometry. The length of the prongs increases gradually from a first value at one end of comb device 10, 20 to a second value in the middle of comb device 10, 20 and, from there, decreases gradually again to the first value in the direction of the other end.

As a result, the mechanical natural frequencies of prongs 101 to 105 and 201 to 205 are varied.

Figure 2:
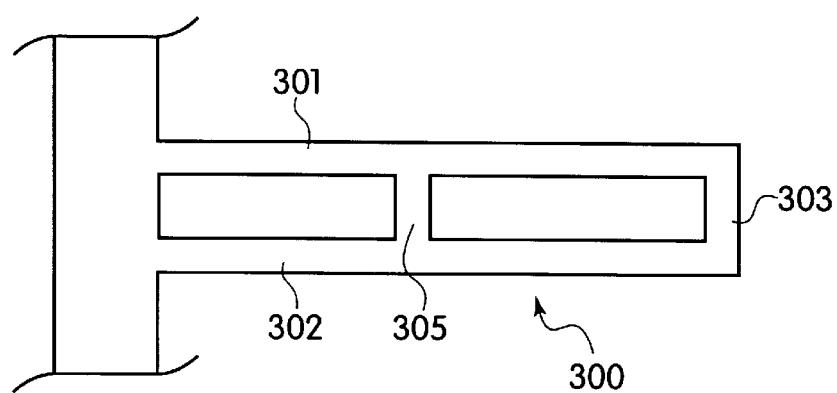
FIG. 2 shows an embodiment of a layout of a prong with a double-arm structure in the micromechanical comb structure according to the present invention.

FIG. 2 shows an embodiment of the layout of one prong with a double-arm structure in the micromechanical comb structure according to the present invention.

In FIG. 2, 300 designates a prong with a double-arm structure, 301 a first prong, 302 a second prong, 303 a connecting web at the end of prong 300, and 305 a connecting web in the middle of prong 300.

In this embodiment, each natural frequency can be easily set by varying the position or length of the one or more connecting webs.

Figure 3A:
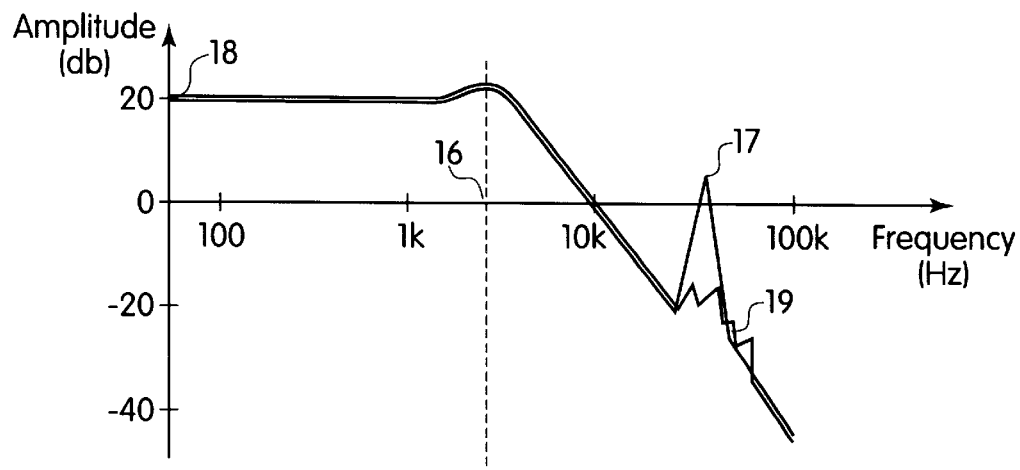
FIG. 3a shows a Bode diagram for an excitation of an acceleration sensor having the comb structure according to the present invention illustrated in FIG. 2 or having a conventional comb structure illustrated in FIGS. 4 or 5, with an amplitude plotted against an excitation frequency.
Figure 3B:
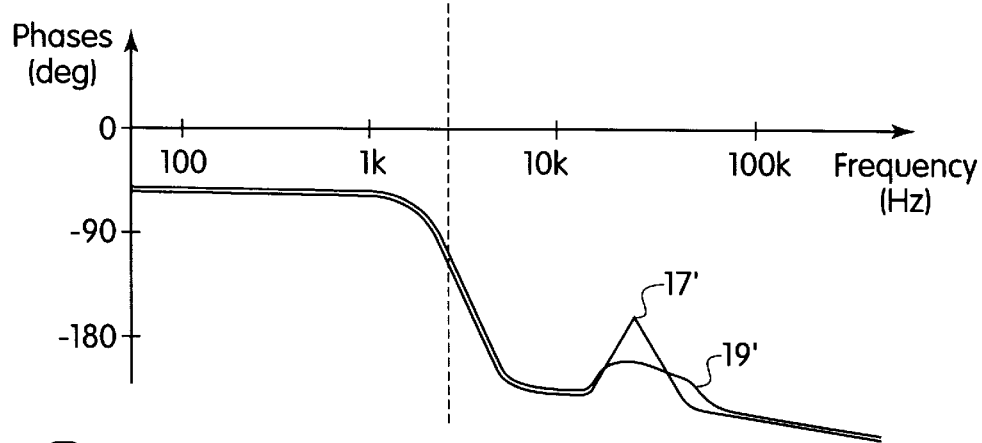
FIG. 3b shows a Bode diagram for the excitation of the acceleration sensor, with a phase plotted against the excitation frequency.
Figure 4:
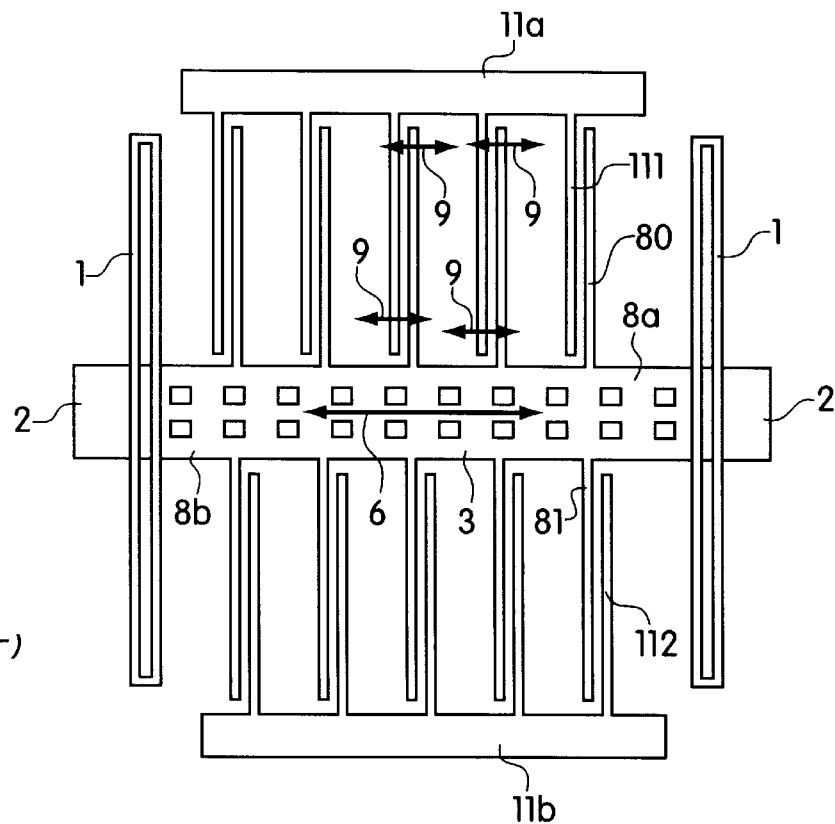
FIG. 4 shows a schematic diagram of a first conventional micromechanical comb structure of the acceleration sensor.
Figure 5:
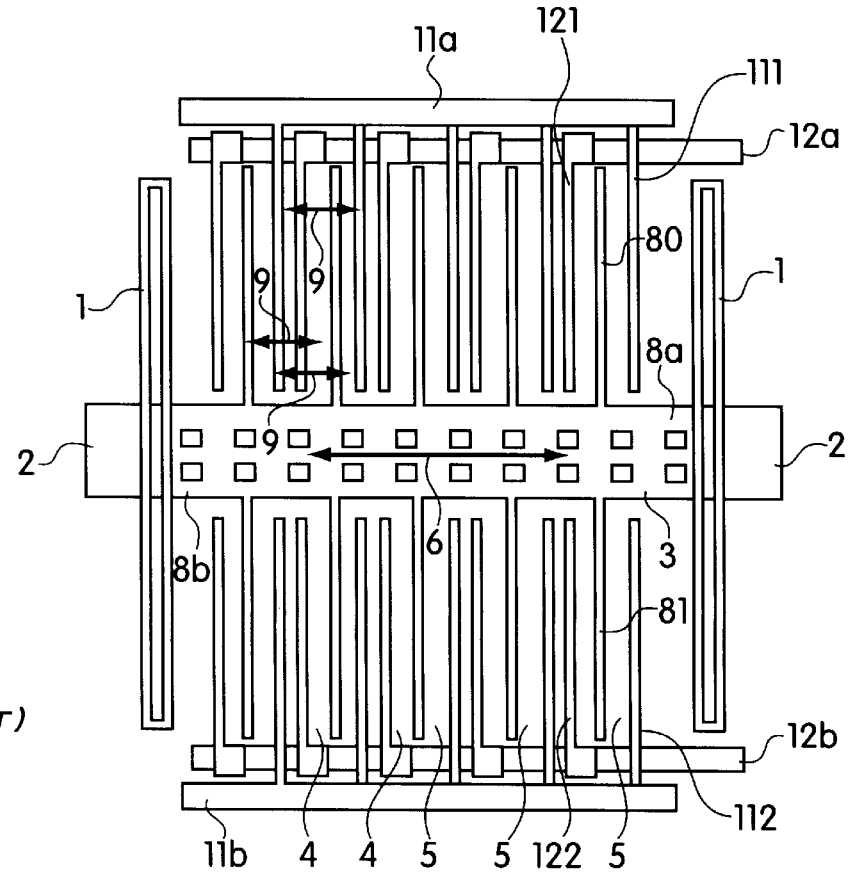
FIG. 5 shows a schematic diagram of a second conventional micromechanical comb structure of the acceleration sensor.
Figure 6:
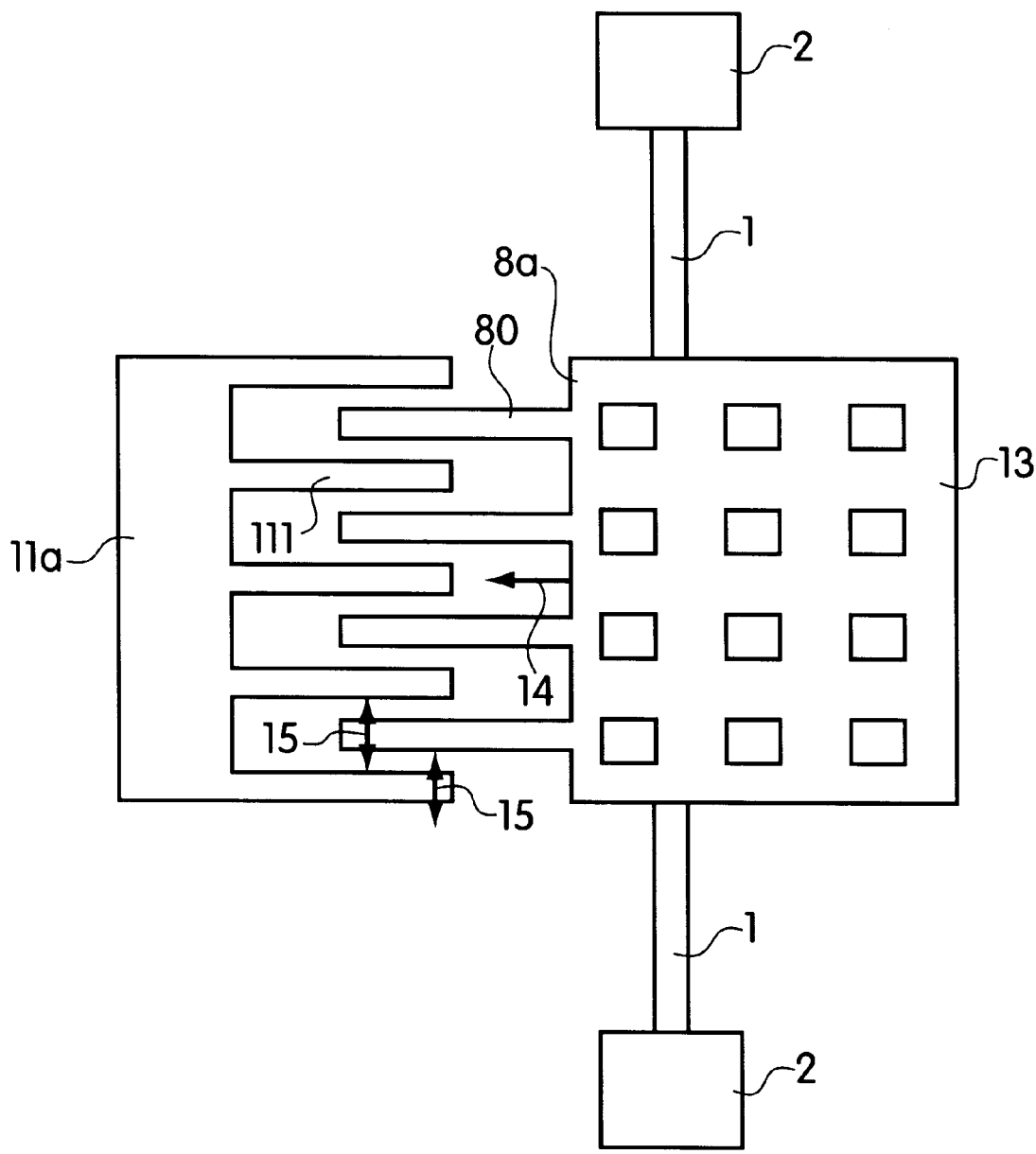
FIG. 6 shows a schematic diagram of a micromechanical comb structure of a micromechanical drive.

FIGS. 3a and 3b show a Bode diagram for the excitation of an acceleration sensor having the embodiment of the a comb structure according to the present invention. In particular, FIG. 3a shows an amplitude plotted against an excitation frequency, and FIG. 3b shows a phase plotted against the excitation frequency.

As shown in FIGS. 3a and 3b, the prong modes in region 19 are distributed and are no longer concentrated at peak 17, so that drastic, abrupt phase changes no longer occur. As a result, the natural frequencies no longer have a disturbing effect on the measurement or closed-loop control method.

Although the present invention was described above on the basis of one embodiment, the micromechanical comb structure is not limited to this embodiment, but can be modified in numerous different ways.

For example, the rigidity of the comb prongs can be modified by any variation in the geometry and material structure, e.g., not only by varying the length and/or width and/or height. Although FIG. 1 shows pairs of prongs having the same geometry, this is not the only option available according to the present invention. For example, variations in geometry can be provided even within the pairs.

The comb structure according to the present invention can also be applied to all conventional micromechanical comb structures without any complicated changes.

List of Reference Numbers:

| | |
|---|---|
| 10 | First comb device |
| 20 | Second comb device |

-continued

| | |
|---|---|
| 101–105 | Prongs of the first comb device |
| 201–205 | Prongs of the second comb device |
| 300 | Prongs with double-arm structure |
| 301 | First prong |
| 302 | Second prong |
| 303 | Connecting web at end of prong |
| 305 | Connecting web in middle of prong |
| 16 | Resonant frequency in working mode |
| 17, 17' | Resonant frequency, abrupt phase change in prong mode |
| 19, 19' | Resonant frequency, phase shift with distributed natural frequencies |
| 18 | Open-loop gain |
| 1 | Spiral spring |
| 2 | Anchoring arrangement |
| 3 | Seismic mass |
| 6 | Sensitive direction |
| 9 | Prong mode |
| 8a, 8b | Comb structures on seismic mass |
| 11a, 11b | Stationary comb structures |
| 111, 112 | Prongs |
| 80, 81 | Prongs |
| 12a, 12b | Stationary comb structures |
| 121, 122 | Prongs |
| 13 | Movable mass |
| 14 | Driving direction |
| 15 | Prong mode |

What is claimed is:

1. A micromechanical comb structure, comprising:
a first comb device including a plurality of first prongs;
a second comb device including a plurality of second prongs, the first prongs meshing with the second prongs to form at least one of a sensor capacitor and an actuator capacitor, the first prongs and the second prongs being movable with respect to each other;
wherein at least one of the first prongs and the second prongs provides a variation in mechanical natural frequencies of at least one of the first prongs and the second prongs.

2. The micromechanical comb structure according to claim 1, wherein the at least one of the first prongs and the second prongs have a variable geometry.

3. The micromechanical comb structure according to claim 2, wherein the variable geometry is defined by at least one of a variable length, a variable width and a variable height.

4. The micromechanical comb structure according to claim 1, wherein the at least one of the first prongs and the second prongs have a variable material structure.

5. The micromechanical comb structure according to claim 1, wherein one of the first prongs and one of the second prongs have a same geometry and form a pair of adjacent prongs.

6. The micromechanical comb structure according to claim 1, wherein the first prongs gradually increase from a first predetermined length at a first end of the first comb device to a second predetermined length in a middle portion of the first comb device, the first prongs gradually decreasing from the second predetermined length at the middle portion of the first comb device to the first predetermined length in a direction of a second end of the first comb device, and wherein the second prongs gradually increase from the first predetermined length at a first end of the second comb device to the second predetermined length in a middle portion of the second comb device, the second prongs gradually decreasing from the second predetermined length at the middle portion of the second comb device to the first predetermined length in a direction of a second end of the second comb device.

7. The micromechanical comb structure according to claim 1, wherein the at least one of the first prongs and the second prongs have at least one portion which has a double-arm structure, the double-arm structure including a third prong, a fourth prong and at least one connecting web disposed between the third and fourth prongs.

8. The micromechanical comb structure according to claim 1, wherein the first comb device and the second comb device together form a micromechanical acceleration sensor.

9. A micromechanical acceleration sensor, comprising:
a micromechanical comb structure including:
a first comb device having a plurality of first prongs, and
a second comb device having a plurality of second prongs, the first prongs meshing with the second prongs to form at least one of a sensor capacitor and an actuator capacitor,
wherein at least one of the first prongs and the second prongs provide a variation in mechanical natural frequencies of at least one of the first prongs and the second prongs.

10. A micromechanical drive, comprising:
a micromechanical comb structure including:
a first comb device having a plurality of first prongs, and
a second comb device having a plurality of second prongs, the first prongs meshing with the second prongs to form at least one of a sensor capacitor and an actuator capacitor,
wherein at least one of the first prongs and the second prongs provide a variation in mechanical natural frequencies of at least one of the first prongs and the second prongs.

* * * * *